(12) United States Patent
Kazama et al.

(10) Patent No.: US 8,749,857 B2
(45) Date of Patent: Jun. 10, 2014

(54) IMAGE READER, IMAGE FORMING APPARATUS, COMPUTER READABLE MEDIUM FOR IMAGE ADJUSTMENT AND IMAGE ADJUSTING METHOD

(75) Inventors: Toshiyuki Kazama, Kanagawa (JP); Kenji Hyoki, Kanagawa (JP); Masaki Fujise, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 358 days.

(21) Appl. No.: 13/091,787

(22) Filed: Apr. 21, 2011

(65) Prior Publication Data

US 2012/0099164 A1 Apr. 26, 2012

(30) Foreign Application Priority Data

Oct. 22, 2010 (JP) ................. 2010-237595

(51) Int. Cl.
| | |
|---|---|
| *H04N 1/04* | (2006.01) |
| *H04N 1/32* | (2006.01) |
| *H04N 1/40* | (2006.01) |
| *G03F 3/08* | (2006.01) |
| *G06K 1/00* | (2006.01) |
| *G06F 3/12* | (2006.01) |
| *G06F 3/038* | (2013.01) |
| *G03B 27/52* | (2006.01) |
| *G03G 15/00* | (2006.01) |
| *G06K 9/36* | (2006.01) |
| *G06K 9/03* | (2006.01) |

(52) U.S. Cl.
USPC .......... 358/475; 358/447; 358/474; 358/1.18; 358/497; 358/442; 358/518; 358/449; 358/1.15; 358/1.5; 345/204; 355/25; 399/379; 399/391; 382/309; 382/287

(58) Field of Classification Search
USPC ........ 358/475, 447, 474, 1.18, 497, 442, 518, 358/449, 1.15, 1.5; 345/204; 355/25; 382/309, 287; 399/379, 391
See application file for complete search history.

(56) References Cited

U.S. PATENT DOCUMENTS

| | | | |
|---|---|---|---|
| 2008/0049268 A1* | 2/2008 | Hardy et al. | 358/474 |
| 2010/0053694 A1* | 3/2010 | Tsuchida | 358/447 |
| 2010/0322688 A1* | 12/2010 | Islam et al. | 399/379 |
| 2011/0222943 A1* | 9/2011 | Tanaka | 399/391 |

FOREIGN PATENT DOCUMENTS

| | | |
|---|---|---|
| JP | 2004-271739 A | 9/2004 |
| JP | 4343558 B2 | 10/2009 |
| JP | 2010185704 A | 8/2010 |

OTHER PUBLICATIONS

Australian Office Action issued Feb. 28, 2013 in corresponding Australian Patent Application No. 2011202545.

* cited by examiner

*Primary Examiner* — Charlotte M Baker
*Assistant Examiner* — Rury Grisham
(74) *Attorney, Agent, or Firm* — Sughrue Mion, PLLC

(57) ABSTRACT

An image reader includes a light source that irradiates light to a recording material on which an image is formed, a generation section that receives light reflected from the recording material and generates image information from the received light, and a processing section that extracts information corresponding to a window region of the recording material set in advance, as correction information, from the image information generated by the generation section when light from the light source is irradiated to the recording material on which the image is formed.

9 Claims, 11 Drawing Sheets

FIG.11

| TYPE OF TEST CHART | | |
|---|---|---|
| NUMBER OF SHEETS OF PAPER TO BE PRINTED | | |
| RECTANGULAR SIZE | | |
| ⋮ | | |
| $x_1$ COORDINATES | $y_1$ COORDINATES | CONTENTS OF PROCESSING |
| $x_2$ COORDINATES | $y_2$ COORDINATES | CONTENTS OF PROCESSING |
| ⋮ | | |

IMAGE READER, IMAGE FORMING APPARATUS, COMPUTER READABLE MEDIUM FOR IMAGE ADJUSTMENT AND IMAGE ADJUSTING METHOD

CROSS-REFERENCE TO RELATED APPLICATION

This application is based on and claims priority under 35 USC 119 from Japanese Patent Application No. 2010-237595 filed on Oct. 22, 2010.

BACKGROUND

1. Technical Field

The present invention relates to an image reader, an image forming apparatus, a computer readable medium for image adjustment and an image adjusting method.

2. Related Art

In the related art, a copying machine, a facsimile, a scanner for computer input and the like are used as image readers that read image information from paper on which an image has been formed. In this kind of image reader, an image on the paper is read by irradiating light from a light source disposed on the transport path of the paper and receiving the light reflected from the paper using an image sensor.

Here, an image formed on a recording material may be adjusted on the basis of an image read by an image reader, for example. In this case, if all of the read image information is processed, it may take too long to adjust the image formed on the recording material.

SUMMARY

According to an aspect of the invention, there is provided an image reader including:

a light source that irradiates light to a recording material on which an image is formed;

a generation section that receives light reflected from the recording material and generates image information from the received light; and a processing section that extracts information corresponding to a window region of the recording material set in advance, as correction information, from the image information generated by the generation section when light from the light source is irradiated to the recording material on which the image is formed.

BRIEF DESCRIPTION OF THE DRAWINGS

Exemplary embodiments of the present invention will be described in detail based on the following figures, wherein:

FIG. 11 is a diagram illustrating an example of the contents of a command transmitted from a main controller to an image reader.

DETAILED DESCRIPTION

Hereinafter, an exemplary embodiment of the invention will be described with reference to the accompanying drawings.

<Explanation Regarding an Image Forming Apparatus>

Figure 1:
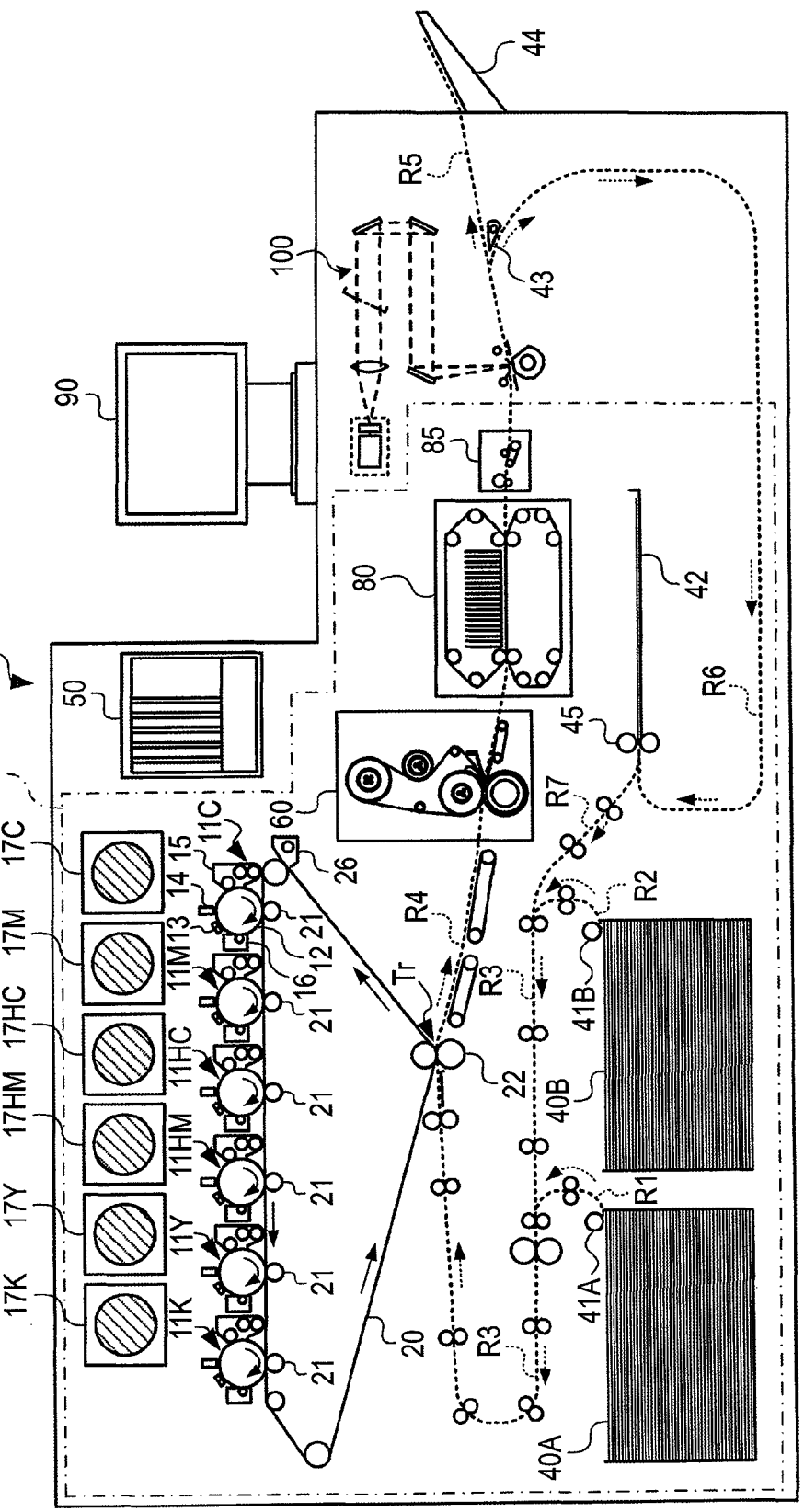
FIG. 1 is a diagram illustrating an image forming apparatus to which an image reader according to the present exemplary embodiment is applied.

FIG. 1 is a diagram illustrating an image forming apparatus 1 to which an image reader 100 according to the present exemplary embodiment is applied.

The image forming apparatus 1 is a so-called "tandem type" color printer and includes: an image forming section 10 that forms an image on paper as an example of a recording material on the basis of image data; a main controller 50 that makes an overall control of the image forming apparatus 1 or executes communication with a personal computer (PC) or the like and image processing on the image data, for example; a user interface (UI) section 90 that receives the operation input from a user or displays various kinds of information for the user; and the image reader 100 as an example of a reading unit that reads an image in order to adjust the image formed on the paper by the image forming section 10.

<Explanation Regarding an Image Forming Section>

The image forming section 10 is a functional section that forms an image using an electrophotographic method, for example, and includes: six image forming units 11C, 11M, 11HC, 11HM, 11Y, and 11K (hereinafter, referred to as an "image forming unit 11") as examples of a toner image forming unit that are disposed in parallel; an intermediate transfer belt 20 onto which each color toner image formed on a photoconductive drum 12 of each image forming unit 11 is transferred; and a primary transfer roller 21 that transfers (primary transfer) each color toner image formed by each image forming unit 11 onto the intermediate transfer belt 20. In addition, the image forming section 10 includes a secondary transfer roller 22 that collectively transfers (secondary transfer) the respective color toner images, which have been transferred on the intermediate transfer belt 20 in a state where they overlap each other, onto paper and a fixing unit 60 as an example of a fixing section (fixing device) that fixes each of the secondary-transferred color toner images on the paper. In addition, the region where the secondary transfer roller 22 is disposed and each color toner image on the intermediate transfer belt 20 is secondarily transferred onto the paper is called a "secondary transfer region Tr" hereinbelow.

In addition, the image forming section 10 includes a cooling unit 80 as an example of a cooler that cools each color toner image fixed on paper by the fixing unit 60 in order to facilitate the fixing of each color toner image and a curl correction unit 85 that corrects the curl of the paper. In addition, in the image forming apparatus 1 according to the present exemplary embodiment, a transfer unit that transfers a toner image onto paper is formed by the intermediate transfer belt 20, the primary transfer roller 21, and the secondary transfer roller 22.

<Explanation Regarding an Image Forming Unit>

Each image forming unit 11 includes as examples of a functional member: the photoconductive drum 12 on which an electrostatic latent image is formed and then each color toner image is formed; a charging section 13 that charges the surface of the photoconductive drum 12 with an electric potential set in advance; an exposure section 14 that exposes the photoconductive drum 12 charged by the charging section 13 on the basis of image data; a developing section 15 that develops the electrostatic latent image formed on the photoconductive drum 12 with each color toner, and a cleaner 16 that cleans the surface of the photoconductive drum 12 after transfer.

The developing section 15 of each image forming unit 11 is connected to each of corresponding toner containers 17C, 17M, 17HC, 17HM, 17Y, and 17K (hereinafter, referred to as a "toner container 17"), which store each color toner, on the toner transport path (not shown). Moreover, each color toner is supplied from the toner container 17 to the developing section 15 by a supply screw (not shown) provided on the toner transport path.

The image forming units 11 are formed almost similarly except for toner contained in the developing section 15 and form toner images of C (cyan) color, M (magenta) color, HC (high-chroma cyan) color, HM (high-chroma magenta) color, Y (yellow) color, and K (black) color, respectively. Here, the HC color has a hue of a cyan system and is a cyan color that has a color tone brighter than the C color and a relatively high chroma, the HM color has a hue of a magenta system and is a magenta color that has a color tone brighter than the M color and a relatively high chroma.

<Explanation Regarding a Fixing Unit>

Figure 2:
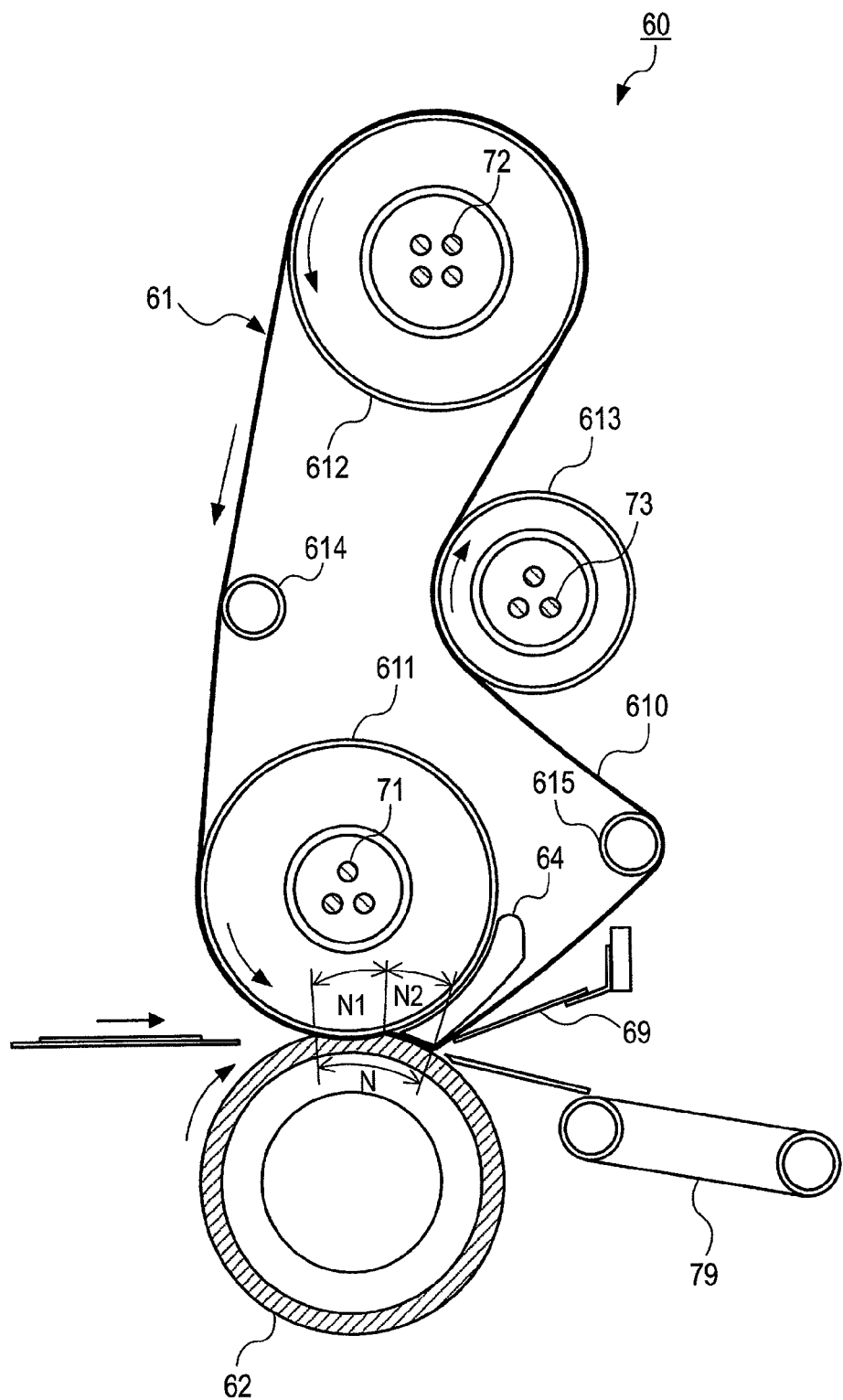
FIG. 2 is a cross-sectional configuration diagram for explaining the configuration of a fixing unit.

FIG. 2 is a cross-sectional configuration diagram for explaining the configuration of the fixing unit 60.

The main section of the fixing unit 60 is formed by a fixing belt module 61, which heats paper, and a pressure roller 62, which is free to be in contact or non-contact with the fixing belt module 61.

The fixing belt module 61 includes: a fixing belt 610; a fixing roller 611 that rotates while stretching the fixing belt 610 and that heats the fixing belt 610 from the inner side in a nip portion N, which is a region where the fixing belt module 61 and the pressure roller 62 come in contact with each other by pressure (in contact with each other while being pressed against each other); an internal heating roller 612 that heats the fixing belt 610 while stretching the fixing belt 610 from the inner side; and an external heating roller 613 that heats the fixing belt 610 while stretching the fixing belt 610 from the outer side. In addition, the fixing belt module 61 includes: a stretching roller 614 that stretches the fixing belt 610 between the fixing roller 611 and the internal heating roller 612 (upstream side of the nip portion N); a peeling pad 64 that is located in a downstream region of the nip portion N and disposed at the position near the fixing roller 611; and a stretching roller 615 that stretches the fixing belt 610 at the downstream side of the nip portion N. In addition, halogen heaters 71 to 73 serving as heating sources are disposed inside the fixing roller 611, the internal heating roller 612, and the external heating roller 613, respectively.

<Explanation Regarding a Paper Transport System in the Image Forming Apparatus>

In addition, the image forming section 10 includes as a paper transport system: plural (two in the present exemplary embodiment) paper storage containers 40A and 40B that store paper; pickup rollers 41A and 41B that pick up the paper stored in the paper storage containers 40A and 40B and transport the paper; a first transport path R1 along which the paper from the paper storage container 40A is transported; and a second transport path R2 along which the paper from the paper storage container 40B is transported. In addition, the image forming section 10 includes a third transport path R3 along which the paper from the paper storage containers 40A and 40B is transported toward the secondary transfer region Tr. In addition, the image forming section 10 includes: a fourth transport path R4 along which the paper, on which each color toner image has been transferred in a secondary transfer region Tr, is transported so as to pass through the fixing unit 60, the cooling unit 80, the curl correction unit 85, and the image reader 100; and a fifth transport path R5 along which the paper from the image reader 100 is transported toward a paper loading section 44 provided in a paper discharging section of the image forming apparatus 1.

Transport rollers or transport belts are disposed along the first to fifth transport paths R1 to R5, and delivered paper is transported sequentially.

<Explanation Regarding a Double-Sided Transport System>

In addition, the image forming section 10 includes as a double-sided transport system: an intermediate paper storage container 42 that holds paper temporarily, which has a first surface with each color toner image fixed by the fixing unit 60, a sixth transport path R6 along which paper from the image reader 100 is transported toward the intermediate paper storage container 42; and a seventh transport path R7 along which the paper stored in the intermediate paper storage container 42 is transported toward the third transport path R3. In addition, the image forming section 10 includes: a distribution mechanism section 43 that is disposed at the paper-transport-direction downstream side of the image reader 100 and that selectively distributes paper to the fifth transport path R5, along which the paper is transported toward the paper loading section 44, and the sixth transport path R6, along which the paper is transported to the intermediate paper storage container 42; and a pickup roller 45 that picks up paper stored in the intermediate paper storage container 42 and transports the paper toward the seventh transport path R7.

<Explanation Regarding an Image Forming Operation>

Next, a basic image forming operation in the image forming apparatus 1 according to the present exemplary embodiment will be described with reference to FIGS. 1 and 2.

Each image forming unit 11 of the image forming section 10 forms each color toner image of C color, M color, HC color, HM color, Y color, and K color through the electrophotographic process using the functional sections described above. Each color toner image formed by each image forming unit 11 is primarily transferred in order onto the intermediate transfer belt 20 by the primary transfer roller 21. As a result, a mixed toner image obtained by overlapping of each color toner is formed. The mixed toner image on the intermediate transfer belt 20 is transported to the secondary transfer region Tr where the secondary transfer roller 22 is disposed with the movement (arrow direction) of the intermediate transfer belt 20.

On the other hand, in the paper transport system, the pickup rollers 41A and 41B performs a rotational operation according to the start timing of image formation in each image forming unit 11 such that paper designated, for example, by the UI section 90 is picked up by the pickup rollers 41A and 41B from either the paper storage container 40A or the paper storage container 40B. The paper picked up by the pickup rollers 41A and 41B is transported along the first transport path R1 or the second transport path R2 and the third transport path R3 and arrives at the secondary transfer region Tr.

In the secondary transfer region Tr, the mixed toner image held on the intermediate transfer belt 20 is secondarily transferred onto the paper collectively by the transfer electric field formed by the secondary transfer roller 22.

Then, the paper with the transferred mixed toner image thereon is separated from the intermediate transfer belt 20 and is then transported toward the nip portion N of the fixing unit 60 along the fourth transport path R4. In addition, a non-fixed toner image on the surface of the paper passing through the nip portion N is fixed on the paper by pressure and heat mainly acting on a roller nip portion N1.

That is, in the fixing unit 60 of the present exemplary embodiment, heat acting on the roller nip portion N1 is mainly supplied by the fixing belt 610. The fixing belt 610 is heated by heat supplied through the fixing roller 611 from the halogen heater 71 disposed inside the fixing roller 611, heat supplied through the internal heating roller 612 from the halogen heater 72 disposed inside the internal heating roller 612, and heat supplied through the external heating roller 613 from the halogen heater 73 disposed inside the external heating roller 613. As a result, since heat energy is supplied not only from the fixing roller 611 but also from the internal heating roller 612 and the external heating roller 613, a sufficient amount of heat is ensured in the roller nip portion N1 even if the process speed is high.

The paper is transported to a peeling pad nip portion N2 after passing through the roller nip portion N1. The peeling pad nip portion N2 is configured such that the fixing belt 610 comes in contact with the pressure roller 62 by pressure when the peeling pad 64 is pressed by the pressure roller 62. Accordingly, the roller nip portion N1 has a curved shape protruding downward by the curvature of the fixing roller 611, while the peeling pad nip portion N2 has a curved shape protruding upward by the curvature of the pressure roller 62.

For this reason, the movement direction of paper heated and pressed under the curvature of the fixing roller 611 in the roller nip portion N1 is changed to have a curvature toward the opposite direction by the pressure roller 62 in the peeling pad nip portion N2. In this case, a fine microslip occurs between a toner image on the paper and the surface of the fixing belt 610. This weakens the adhesion between the toner image and the fixing belt 610, so that the paper can be easily peeled from the fixing belt 610. Thus, the peeling pad nip portion N2 is also positioned in a preparatory process for ensuring reliable peeling in the final peeling process.

Moreover, at the exit of the peeling pad nip portion N2, the fixing belt 610 is transported so as to wind around the peeling pad 64. Accordingly, the transport direction of the fixing belt 610 abruptly changes in that place. That is, since the fixing belt 610 moves along the outside surface of the peeling pad 64, bending of the fixing belt 610 becomes large. Accordingly, the paper adhering to the fixing belt 610 with weak adhesion in the peeling pad nip portion N2 is separated from the fixing belt 610 through the stiffness of the paper itself.

Then, the paper separated from the fixing belt 610 is guided by a peeling guide plate 69 disposed at the downstream side of the peeling pad nip portion N2. Then, the paper guided by the peeling guide plate 69 is transported toward the cooling unit 80 by a paper discharge belt 79 and is cooled by the cooling unit 80. Then, curving of the paper is corrected by the curl correction unit 85, and the image recorded on the paper is read by the image reader 100. Then, the paper having passed through the image reader 100 is guided to the fifth transport path R5 by the distribution mechanism section 43 at the time of single-sided printing and is transported toward the paper loading section 44.

In addition, toner adhering to the photoconductive drum 12 after primary transfer (remaining toner after primary transfer) and toner adhering to the intermediate transfer belt 20 after secondary transfer (remaining toner after secondary transfer) are removed by the cleaner 16 and a belt cleaner 26, respectively.

On the other hand, at the time of double-sided printing, paper having a fixed image on its first surface through the process described above passes through the image reader 100, is guided to the sixth transport path R6 by the distribution mechanism section 43, and is transported to the intermediate paper storage container 42 along the sixth transport path R6. Then, the pickup roller 45 rotates according to the start timing of image formation of the second surface by each image forming unit 11, such that the paper is picked up from the intermediate paper storage container 42. The paper picked up by the pickup rollers 41A and 41B is transported along the seventh transport path R7 and the third transport path R3 and arrives at the secondary transfer region Tr.

In the secondary transfer region Tr, each color toner image of the second surface held on the intermediate transfer belt 20 is secondarily transferred onto the paper collectively by the transfer electric field formed by the secondary transfer roller 22, similar to the case of the first surface.

Then, similar to the case of the first surface, the paper having toner images transferred on both the surfaces is fixed by the fixing unit 60 and cooled by the cooling unit 80. Then, curving of the paper is corrected by the curl correction unit 85, and the image recorded on the paper is read by the image reader 100. Then, the paper having passed through the image reader 100 is guided to the fifth transport path R5 by the distribution mechanism section 43 and transported toward the paper loading section 44.

In this way, the image formation processing in the image forming apparatus 1 is repeatedly executed as often as the number of sheets of paper to be printed.

<Explanation Regarding an Image Reader>

Figure 3:
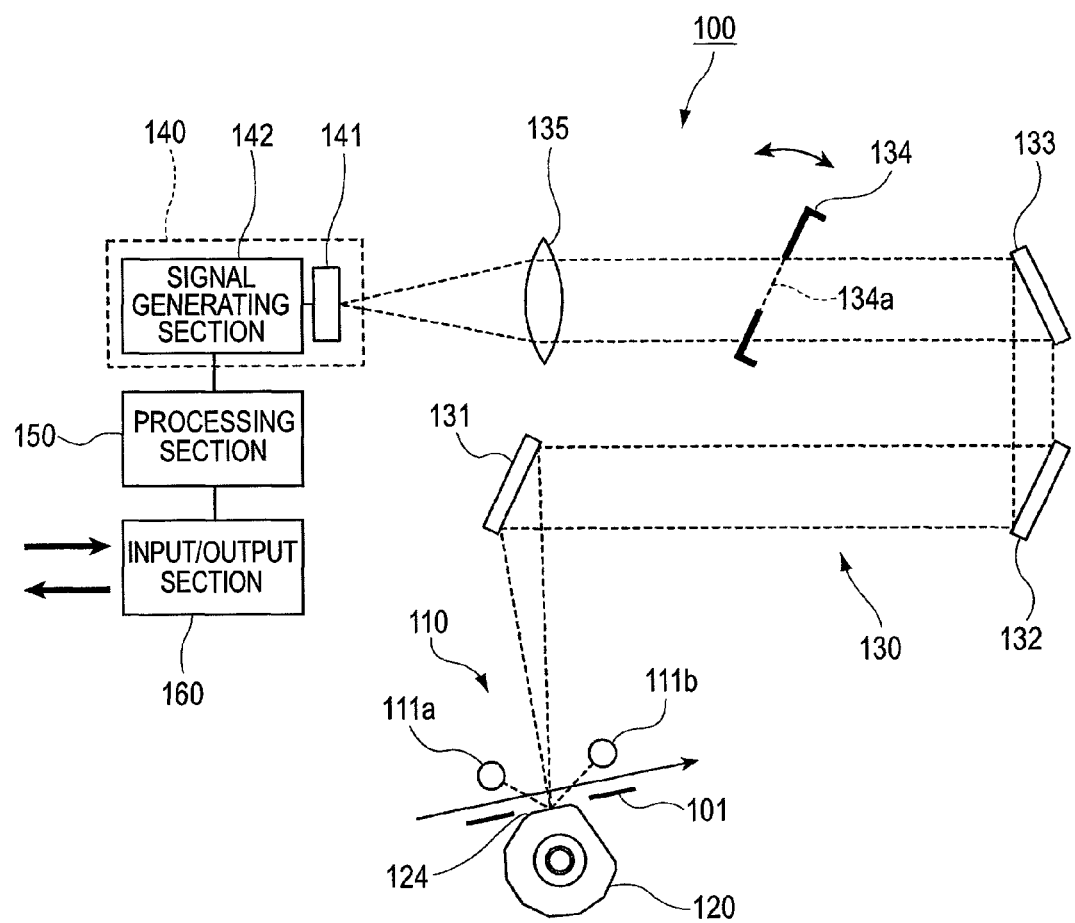
FIG. 3 is a diagram illustrating the image reader according to the present exemplary embodiment.

FIG. 3 is a diagram illustrating the image reader 100 according to the present exemplary embodiment.

In the present exemplary embodiment, the image reader 100 is an example of a reading unit that reads an image from paper having a toner image fixed by the fixing unit 60. In addition, the image reader 100 includes: a light source 110 that irradiates light to paper on which an image is formed; a reading accuracy measuring unit 120 that has various measuring surfaces in order to adjust the image reader 100; an optical system 130 that guides light reflected from the paper or the reading accuracy measuring unit 120; a CCD (Charge Coupled Device) sensor 140 that converts the light guided by the optical system 130 into image information; a processing section 150 that extracts calibration information, which will be described in detail later, from the image information generated by the CCD sensor 140; and an input/output section 160 that performs signal input or output between the image reader 100 and the outside of the image reader 100.

In the present exemplary embodiment, the light source 110 is formed by a pair of straight tubes of xenon fluorescent lamps 111a and 111b. In addition, the light source 110 irradiates light to paper, which is guided to a guide surface 101 and passes through a transport surface, to generate reflected light as the information regarding an image formed on the paper.

In the present exemplary embodiment, since the light source 110 is formed by the pair of xenon fluorescent lamps 111*a* and 111*b*, it becomes difficult for the illuminance of light irradiated to the paper to change even when the paper is transported in a state inclined from the transport surface. That is, if there is one xenon fluorescent lamp, the illuminance of light irradiated to the paper is easily changed when the paper is inclined. In this case, an image may not be able to be successfully read.

Figure 4:
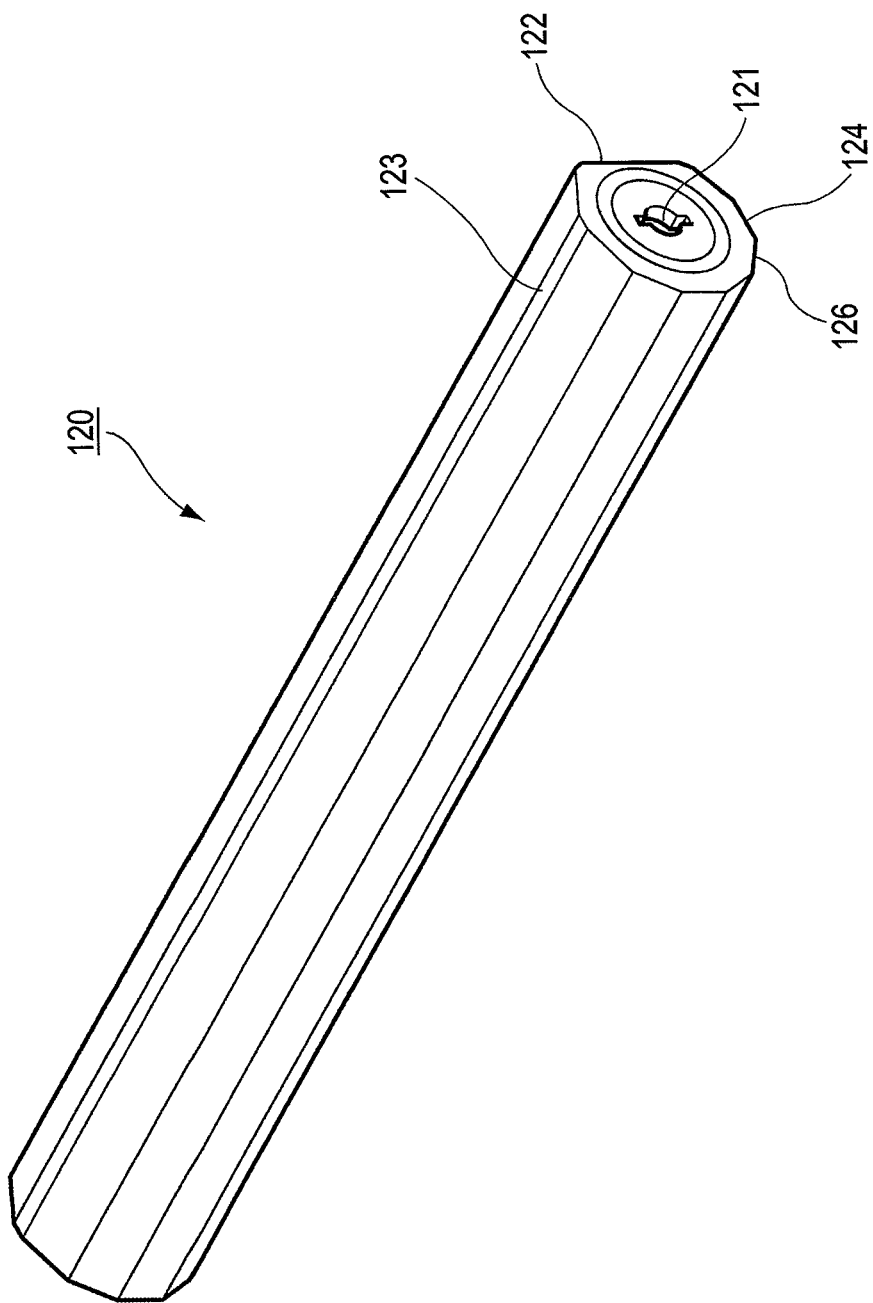
FIG. 4 is a diagram illustrating a reading accuracy measuring unit.

FIG. 4 is a diagram illustrating the reading accuracy measuring unit 120.

In the present exemplary embodiment, the reading accuracy measuring unit 120 is a twelve-surface columnar roller having twelve surfaces on its side portion. In addition, these surfaces are various measuring surfaces for adjusting the image reader 100. The reading accuracy measuring unit 120 is formed of aluminum, for example, and the twelve surfaces are formed by cutting. In addition, in order to suppress a measurement error, black alumite treatment is performed on the surface and a chart for measurement as a reflecting surface is bonded to the surface set in advance using a double-sided tape or the like. In addition, a stepping motor (not shown) and a reduction gear (not shown) are connected to a shaft 121 of the reading accuracy measuring unit 120 so as to be able to rotate around the shaft 121. Accordingly, the measuring surface required to adjust the image reader 100 can be made to face the transport surface side of the paper.

In the present exemplary embodiment, measuring surfaces 124 and 126 are provided. In addition, plural reflecting surfaces of different colors set in advance are disposed in the measuring surfaces 124 and 126. In the present exemplary embodiment, a white reference plate for performing white color calibration as a reflecting surface is provided in the measuring surface 124. In addition, a color reference plate including various color patches for performing color calibration of colors, which are set in advance, as a reflecting surface is provided in the measuring surface 126.

Figure 5:
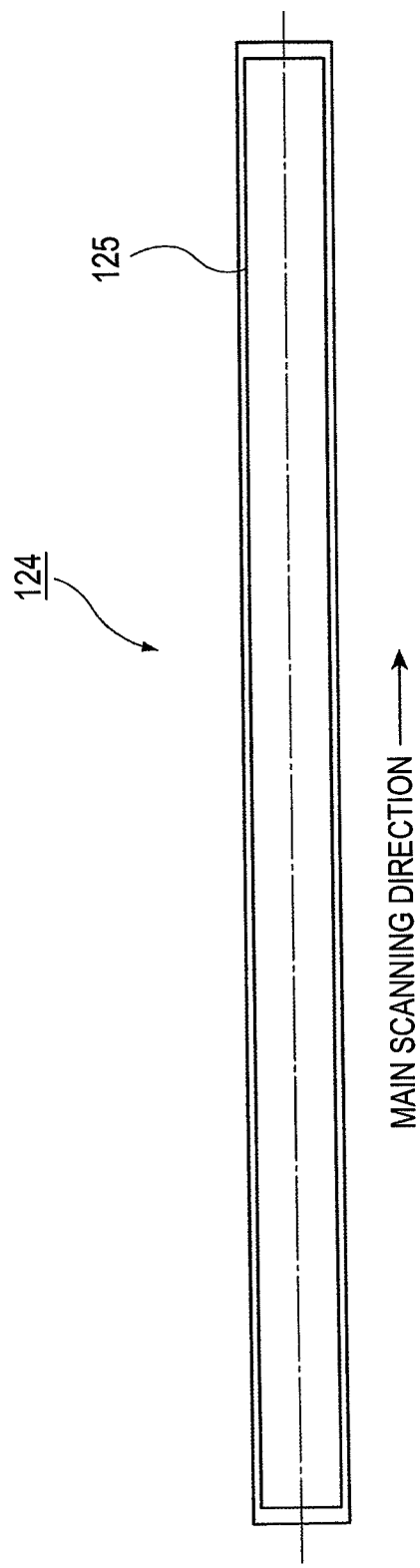
FIG. 5 is a diagram illustrating a measuring surface provided with a white reference plate.

FIG. 5 is a diagram illustrating the measuring surface 124 provided with a white reference plate.

As shown in FIG. 5, a white reference plate 125, which is formed by a white film set in advance, is provided in the measuring surface 124. In the present exemplary embodiment, for example, a white polyester film may be used as the white reference plate 125. In addition, this is fixed to the measuring surface 124 using a double-sided tape, for example.

Using the white reference plate 125, for example, shading correction can be performed in the present exemplary embodiment. That is, a variation in the light intensity distribution in the tube length direction (main scanning direction) of the xenon fluorescent lamps 111*a* and 111*b*, which form the light source 110, is corrected.

Figure 6:
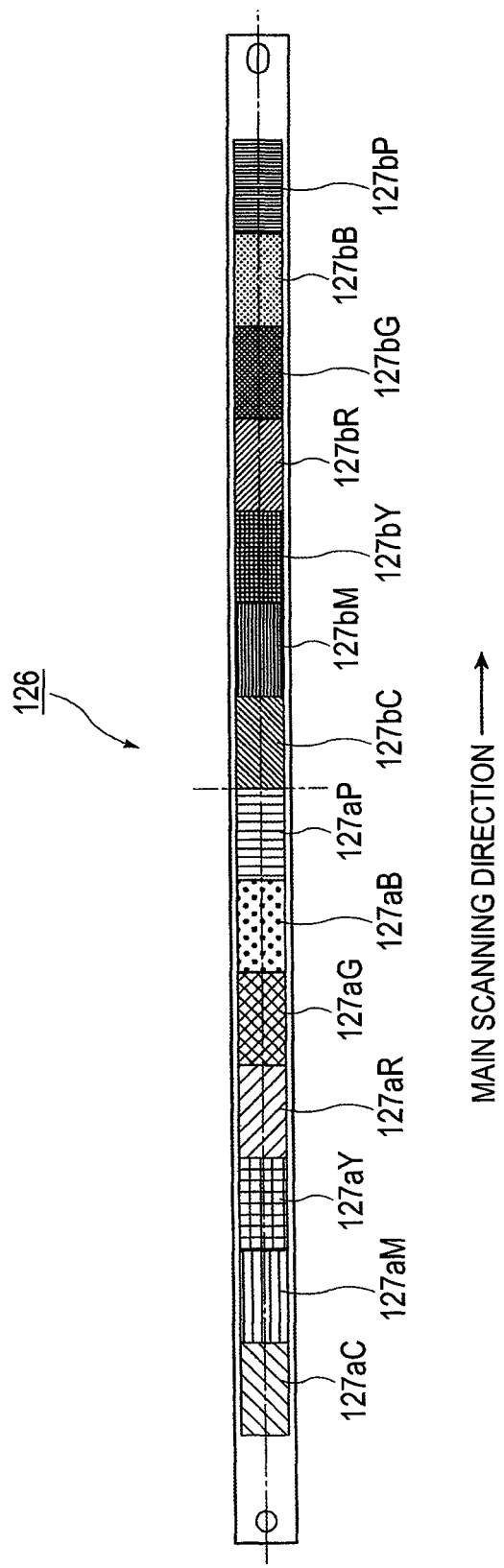
FIG. 6 is a diagram illustrating a measuring surface provided with a color reference plate.

FIG. 6 is a diagram illustrating the measuring surface 126 provided with a color reference plate.

In the measuring surface 126 shown in FIG. 6, plural color reference plates with different colors set in advance are disposed in the longitudinal direction of the measuring surface 126.

As shown in FIG. 6, in the present exemplary embodiment, fourteen color patches with different colors are used as color reference plates. Each color reference plate has a size of 10 mm×20 mm, for example. The color reference plates are arrayed in a line in the main scanning direction. Among these color reference plates, seven color reference plates 127*a*C, 127*a*M, 127*a*Y, 127*a*R, 127*a*G, 127*a*B, and 127*a*P disposed at one side of the measuring surface 126 from the middle in its longitudinal direction are so-called highlight color reference plates, and the reflectance is set to 20%. In the present exemplary embodiment, the seven color reference plates 127*a*C, 127*a*M, 127*a*Y, 127*a*R, 127*a*G, 127*a*B, and 127*a*P correspond to C (cyan) color, M (magenta) color, Y (yellow) color, R (red) color, G (green) color, B (blue) color, and P (process black) color, respectively.

On the other hand, seven color reference plates 127*b*C, 127*b*M, 127*b*Y, 127*b*R, 127*b*G, 127*b*B, and 127*b*P disposed at the other side of the measuring surface 126 from the middle in its longitudinal direction are so-called shadow color reference plates, and the reflectance is set to 60%. In addition, the order of the shadow color reference plates is the same as that of the highlight color reference plates. Moreover, in the present exemplary embodiment, the above-described color reference plates 127*a*C (C20%), 127*a*M (M20%), 127*a*Y (Y20%), 127*a*R (R20%), 127*a*G (G20%), 127*a*B (B20%), 127*a*P (P20%), 127*b*C (C60%), 127*b*M (M60%), 127*b*Y (Y60%), 127*b*R (R60%), 127*b*G (G60%), 127*b*B (B60%), and 127*b*P (P60%) may be collectively called a color reference plate 127.

Moreover, in the present exemplary embodiment, not only the measuring surfaces 124 and 126 but also a retreat surface 122 and a paper holding surface 123 are provided in the reading accuracy measuring unit 120.

The retreat surface 122 is a surface for avoiding the interference between the reading accuracy measuring unit 120 and paper. In the present exemplary embodiment, the image reader 100 operates for calibration of the image reader 100 or the image forming unit 11, for example, when the power source of the image forming apparatus 1 is turned on. This will be described in detail later. Accordingly, at the time of normal image formation, the image reader 100 does not operate and paper just passes the image reader 100. For this reason, it may be that the reading accuracy measuring unit 120 retreats to the position not in contact with paper at the time of normal image formation. The retreat surface 122 has a larger area than those of the other measuring surfaces and can be formed by performing cutting more than the other surfaces when forming the twelve surfaces of the side portion of the reading accuracy measuring unit 120. In addition, when rotating the reading accuracy measuring unit 120 to make the retreat surface 122 face the transport surface side of the paper, the retreat surface 122 is located below the transport surface of the paper and there is no interference between the paper and the retreat surface 122 accordingly. As a result, the reading accuracy measuring unit 120 can retreat to the position not in contact with paper at the time of normal image formation.

The paper holding surface 123 is a surface facing the transport surface side of the paper when performing calibration of the image forming unit 11. When the paper holding surface 123 is made to face the transport surface side of the paper, the paper holding surface 123 is formed so as to be located slightly above the transport surface of the paper. In addition, when the paper passes through the image reader 100, the paper can be made to pass therethrough such that the paper matches the transport surface set in advance by guiding the paper together with the guide surface 101. Accordingly, when reading an image from the paper, there is little reading variation.

Referring back to FIG. 3, the optical system 130 includes mirrors 131, 132, and 133, a diaphragm 134, and a lens 135. Light reflected from the paper or the measuring surface of the reading accuracy measuring unit 120 is reflected by the mirrors 131, 132, and 133, and the intensity of the light is reduced to the light intensity set in advance by the diaphragm 134. The diaphragm 134 has a window 134*a* in the middle and can rotate in an arrow direction with a part of the window 134*a* as the center. Therefore, by rotating the diaphragm 134, the intensity of light passing through the window 134*a* can be changed so that the intensity of light is reduced to the light intensity set in advance. Then, the light is linearly condensed by the lens 135 and imaged on the CCD sensor 140. Here, the line of condensed light is in a direction perpendicular to the plane of FIG. 3, for example.

In the present exemplary embodiment, the CCD sensor 140 is an example of a generation section that receives light reflected from paper and generates the image information from the received light. In the present exemplary embodiment, a CCD 141 that receives light reflected from the paper is linearly disposed in the CCD sensor 140. The CCD 141 corresponding to each color of R (Red), G (Green), and B (Blue) is arrayed in three rows so that an image recorded on the paper can be measured using each color of RGB. That is, the CCD 141 is a three-line color CCD. Then, the light received by the CCD 141 is converted into an electric charge by photoelectric conversion. This electric charge is transmitted to a signal generating section 142.

The signal generating section 142 detects the electric charge transmitted from the CCD 141 as an electric signal. This electric signal is the light intensity data and is also the image data (image information) of an image recorded on the paper. That is, the signal generating section 142 generates the image information from the received light. In addition, since the CCD 141 is a color CCD of three colors of R (Red), G (Green), and B (Blue), the signal generating section 142 generates an R signal, a G signal, and a B signal that are the image information corresponding to each color.

The input/output section 160 performs communication by performing signal input or output between the image reader 100 and the outside of the image reader 100. The signal is a command transmitted from the main controller 50 (refer to FIG. 1) to the image reader 100 or image information transmitted to the controller 50, for example. Therefore, the input/output section 160 can be regarded as an example of an output section for outputting the correction information.

<Explanation Regarding an Image Adjusting Method>

Next, a method of adjusting an image formed by the image forming section 10 (refer to FIG. 1) using the image reader 100 will be described.

Figure 7:
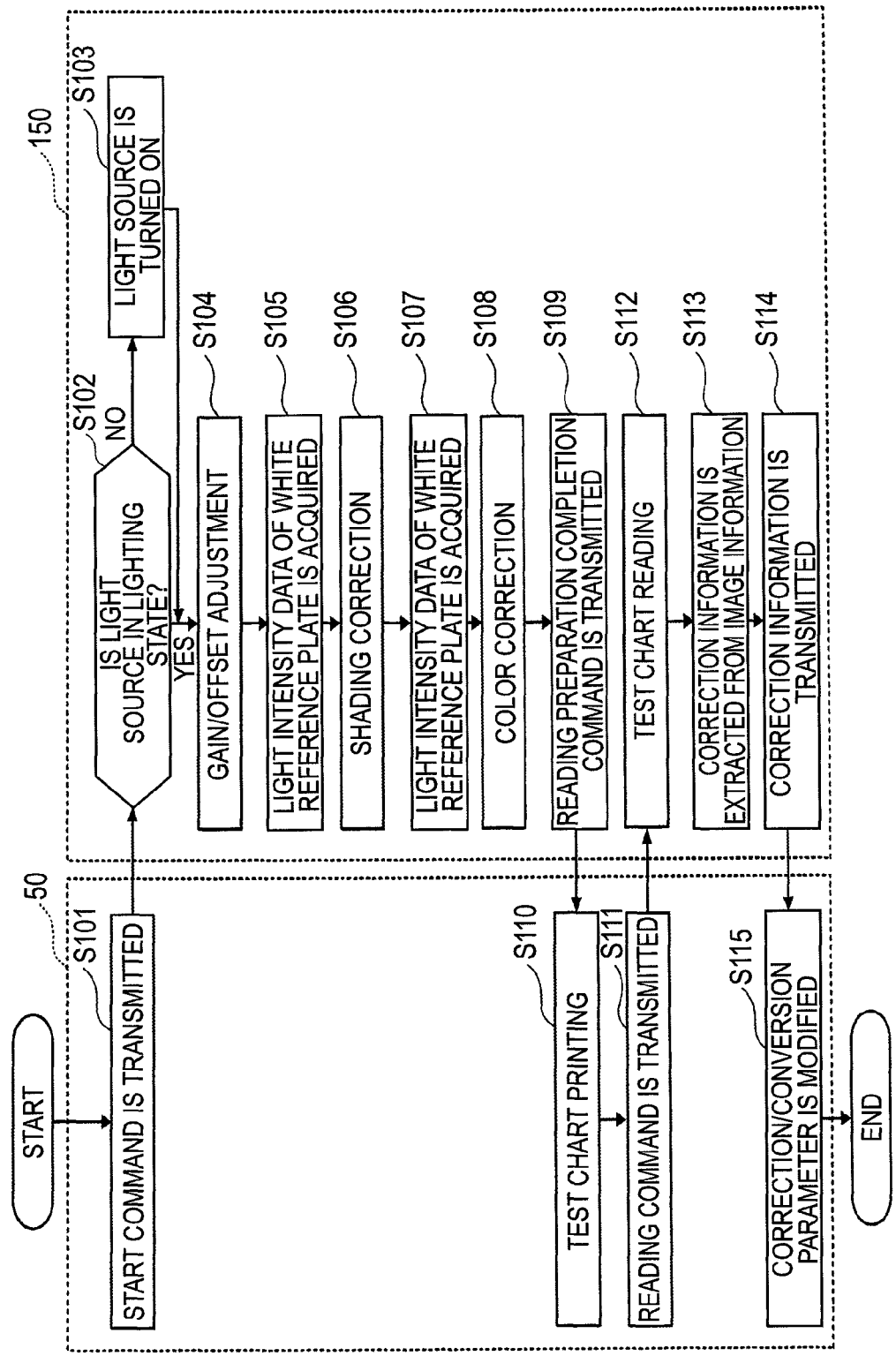
FIG. 7 is a flowchart illustrating a method of adjusting an image formed by an image forming section using the image reader.

FIG. 7 is a flow chart illustrating a method of adjusting an image formed by the image forming section 10 using the image reader 100.

First, the main controller 50 (refer to FIG. 1) of the image forming apparatus 1 transmits a start command to the image reader 100 (step 101). The start command transmitted to the image reader 100 is received by the input/output section 160 (refer to FIG. 3) of the image reader 100 and transmitted to the processing section 150 (refer to FIG. 3). Then, the processing section 150 determines first whether or not the light source 110 is in a lighting state (step 102). If the light source 110 is not in the lighting state, the light source 110 is turned on (step 103). Then, under the lighting state of the light source 110, the processing section 150 performs gain/offset adjustment of the CCD sensor 140 (step 104). Then, the processing section 150 rotates the reading accuracy measuring unit 120 so that the measuring surface 124 provided with the white reference plate 125 faces the transport surface side of the paper. Then, light is irradiated from the light source 110 to the white reference plate 125 so that the light intensity data of the white reference plate 125 is acquired (step 105), and shading correction is performed (step 106). Then, the processing section 150 rotates the reading accuracy measuring unit 120 again so that the measuring surface 126 provided with the color reference plate 127 faces the transport surface side of the paper. Then, light is irradiated from the light source 110 to the color reference plate 127 so that the light intensity data of the color reference plate 127 is acquired (step 107), and color correction is performed (step 108).

Thus, the calibration of the image reader 100 ends and preparation for reading an image is completed. Then, the processing section 150 transmits a reading preparation completion command to the main controller 50 through the input/output section 160 (step 109).

The main controller 50 that has received the reading preparation completion command controls the image forming section 10 (refer to FIG. 1) to print a test chart and the printed test chart is transported to the image reader 100 (step 110). Then, the main controller 50 transmits a command of test chart reading, which will be described in detail later, to the image reader 100 (step 111). Then, the image reader 100 reads the test chart, and the image information as the light intensity data is transmitted to the processing section 150 (step 112). Although described in detail later, the processing section 150 also extracts the correction information from the image information (step 113).

Then, the processing section 150 transmits the correction information to the main controller 50 through the input/output section 160 (step 114). On the basis of the correction information, the main controller 50 modifies each correction/conversion parameter in order to adjust a toner image formed by the image forming unit 11, for example (step 115). In this way, the calibration of the image forming unit 11 and the like can be performed. That is, an image formed on paper can be adjusted by the image forming section 10.

<Explanation Regarding a Test Chart>

Figure 8C:
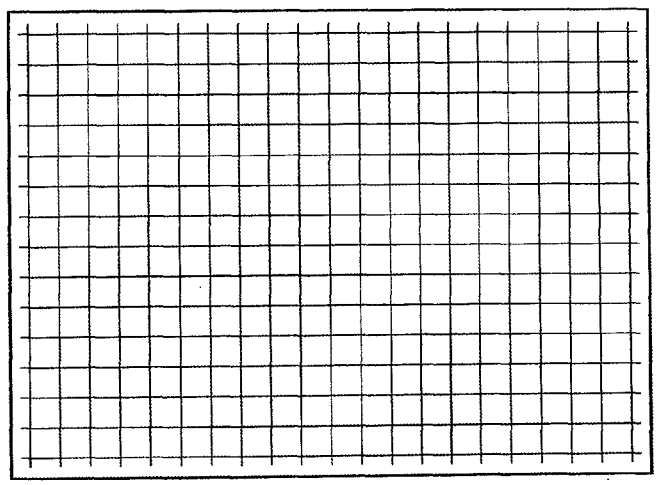
FIGS. 8A to 8C are diagrams showing examples of the test chart used in the present exemplary embodiment.
Figure 8B:
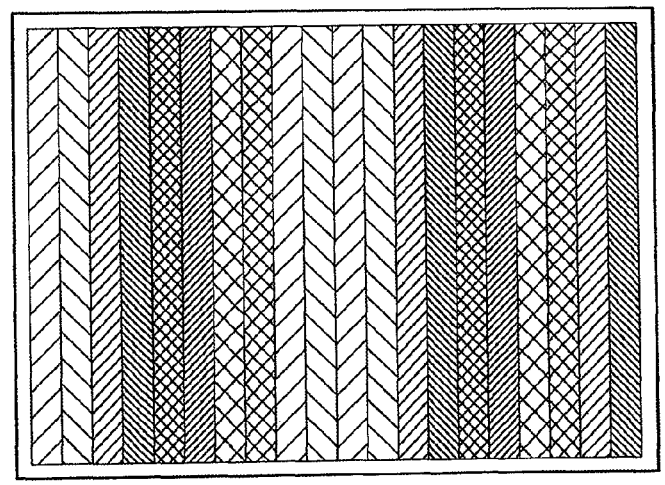
Figure 8A:
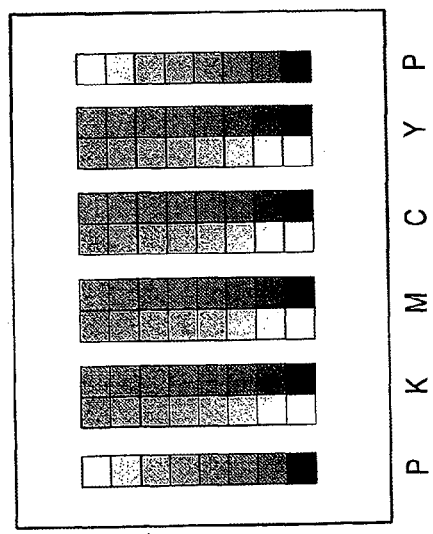

FIGS. 8A to 8C are diagrams drawing showing examples of the test chart used in the present exemplary embodiment. FIG. 8A is a test chart for gradation correction. In addition, FIG. 8B is a test chart for color unevenness correction, and FIG. 8C is a test chart for alignment correction.

In the test chart for gradation correction shown in FIG. 8A, gradation patches printed in P (process black) color, K (black) color, M (magenta) color, C (cyan) color, Y (yellow) color, and P (process black) color are aligned in order from the left side of FIG. 8A. In addition, the gradation patch of P color is printed in eight gray levels, and the gradation patch of each of the other colors is printed in sixteen gray levels. By reading this gradation patch as the image information, the gradation of each color can be corrected.

In addition, in the test chart for color unevenness correction shown in FIG. 8B, a color band pattern including colors set in advance is printed in parallel to the short-side direction of the paper. Then, by reading this color band pattern as the image information, the color unevenness in the short-side direction of the paper can be corrected. In addition, although the color band pattern is printed in parallel to the short-side direction of the paper in the example shown in FIG. 8B, the color unevenness in the long-side direction of the paper can also be corrected by using a test chart in which a color band pattern is printed in parallel to the long-side direction of the paper.

In the test chart for alignment correction shown in FIG. 8C, lines are printed at equal distances in parallel to the short-side and long-side directions of the paper using K colors. As a result, a lattice pattern is printed. Then, by reading the lattice point, which is a place where the lines cross each other, as the image information, alignment correction can be performed.

<Explanation Regarding the Correction Information>

Here, when reading such a test chart and processing all of the read image information using the main controller 50, the time taken to process the image information tends to be long since image adjustment is performed. For this reason, it is difficult to process a test chart in real time whenever one test chart is transmitted. Therefore, in the present exemplary embodiment, the processing section 150 performs processing of extracting the correction information from the read image information as described above. More specifically, the processing section 150 extracts information corresponding to the window region of the paper set in advance, as the correction information, from the image information generated by the CCD sensor 140. In the present exemplary embodiment, the processing section 150 acquires information regarding the position of the corner of the paper, information regarding the position of the end of the paper, and information regarding the characteristic portion, such as the gradation or the position of a lattice point in an image printed as a test chart, as the correction information.

Hereinafter, the processing when the processing section 150 extracts the correction information from the read image information will be described in more detail.

Figure 9:
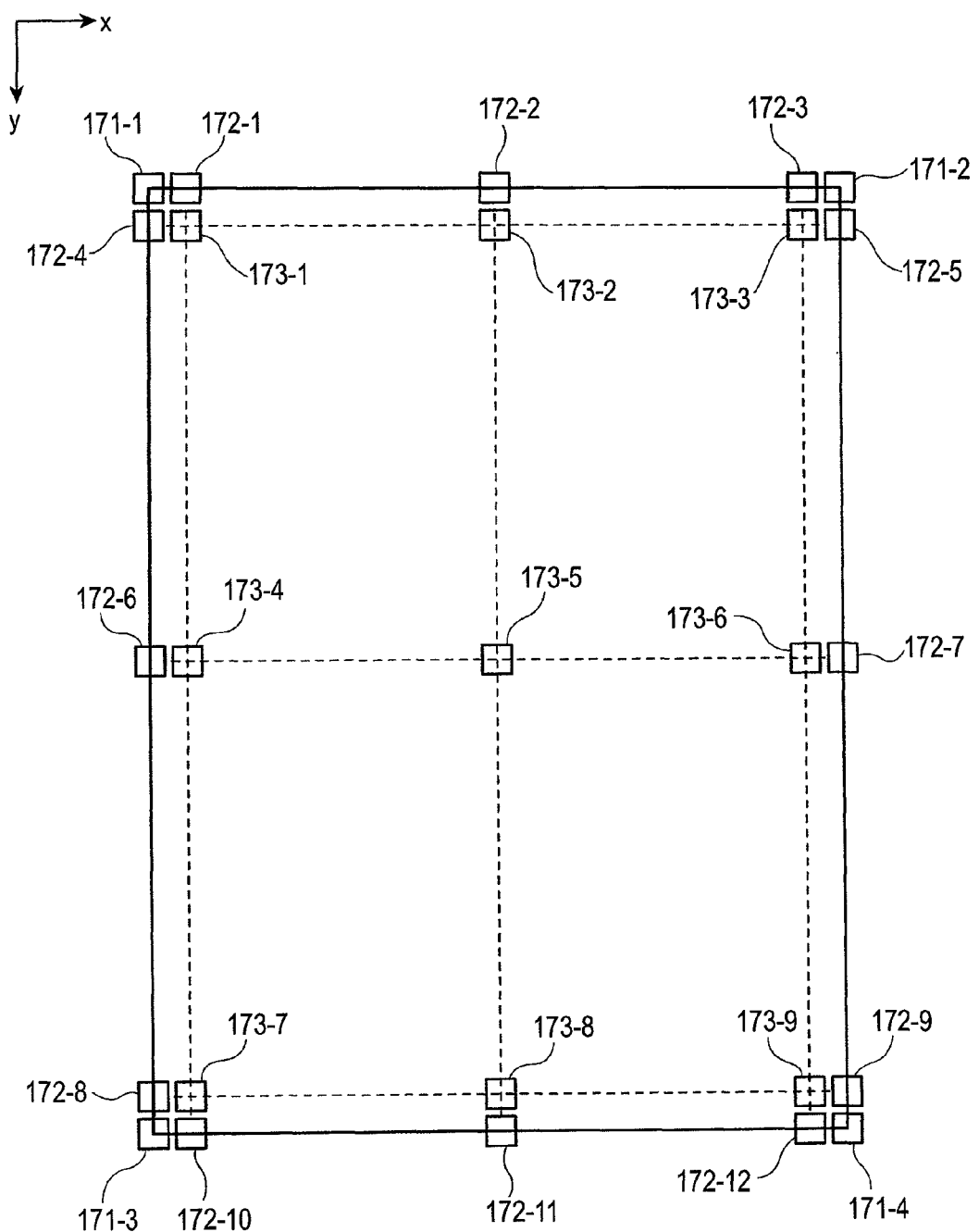
FIG. 9 is a diagram illustrating a window region used to extract the correction information from the image information when the test chart shown in FIG. 8C is used.

FIG. 9 is a diagram illustrating a window region used to extract the correction information from the image information when the test chart shown in FIG. 8C is used.

The window regions 171-1 to 171-4 shown in FIG. 9 are regions for acquiring the information regarding the position of the corner of the paper. In addition, the window regions 172-1 to 172-12 are regions for acquiring the information regarding the position of the end of the paper, and the window regions 173-1 to 173-9 are regions for acquiring the information regarding the lattice point of the paper. In the present exemplary embodiment, the window regions 171-1 to 171-4, the window regions 172-1 to 172-12, and the window regions 173-1 to 173-9 may be collectively called a window region 171, a window region 172, and a window region 173, respectively. In addition, subsequent explanation will be given assuming that the short-side direction of the test chart is an x direction and the long-side direction is a y direction as shown in FIG. 9.

In the present exemplary embodiment, the window regions 171, 172, and 173 are regions with a square shape of 10 mm×10 mm, for example. Moreover, as shown in FIG. 9, the window region 171 is disposed at the positions corresponding to four corners of the paper. In addition, the window region 172 is disposed at the position corresponding to the end of the paper, and the window region 173 is disposed at the position corresponding to the lattice point of the paper. In addition, when the test chart shown in FIG. 8A is used, the window region is disposed at the position corresponding to the position of a gradation patch to be read. In addition, when the test chart shown in FIG. 8B is used, the window region is disposed at the position corresponding to the position of a color band pattern to be read.

That is, the positions of the window regions 171, 172, and 173 are determined to acquire the information regarding the position of the corner of the paper, the information regarding the position of the end of the paper, and the information regarding the characteristic portion in the image, respectively.

In the present exemplary embodiment, the processing section 150 extracts the image information at the positions corresponding to the window regions 171, 172, and 173 from the read image information and sets it as the correction information. Accordingly, the image information required for calibration can be extracted from the read image information. In this case, since it is not necessary to process all of the read image information, the time taken to adjust an image is shortened. As a result, it becomes easy to process a test chart in real time. In addition, different processing required for adjustment of an image can be performed simultaneously. In addition, although the window regions 171, 172, and 173 are set at different positions in the example described above, they may also be set at the same position. In this case, the correction information can be extracted on the basis of the image information of the same window region.

In addition, in the present exemplary embodiment, the information regarding the position of the corner of the paper detected by the window region 171 is used to adjust the position for reading the image recorded on the paper. That is, since there is an individual difference in the image reader 100, for example, the position of a place where image reading is performed in the image reader 100 or the timing of reading may be different in the main scanning direction and the sub-scanning direction. For this reason, if this individual difference is not detected and corrected, the correct range cannot be read. In this case, some of the image information read by the image reader 100 is easily missed, for example. Therefore, in the present exemplary embodiment, using the positional information regarding four corners of the paper, the individual difference is detected and the position for reading the image recorded on the paper is adjusted. Moreover, in the present exemplary embodiment, not only the correction of the range of image reading but also the correction of the positions of the window regions 171, 172, and 173 described above can be performed together.

<Explanation Regarding the Procedure of Extracting Correction Information>

Figure 10:
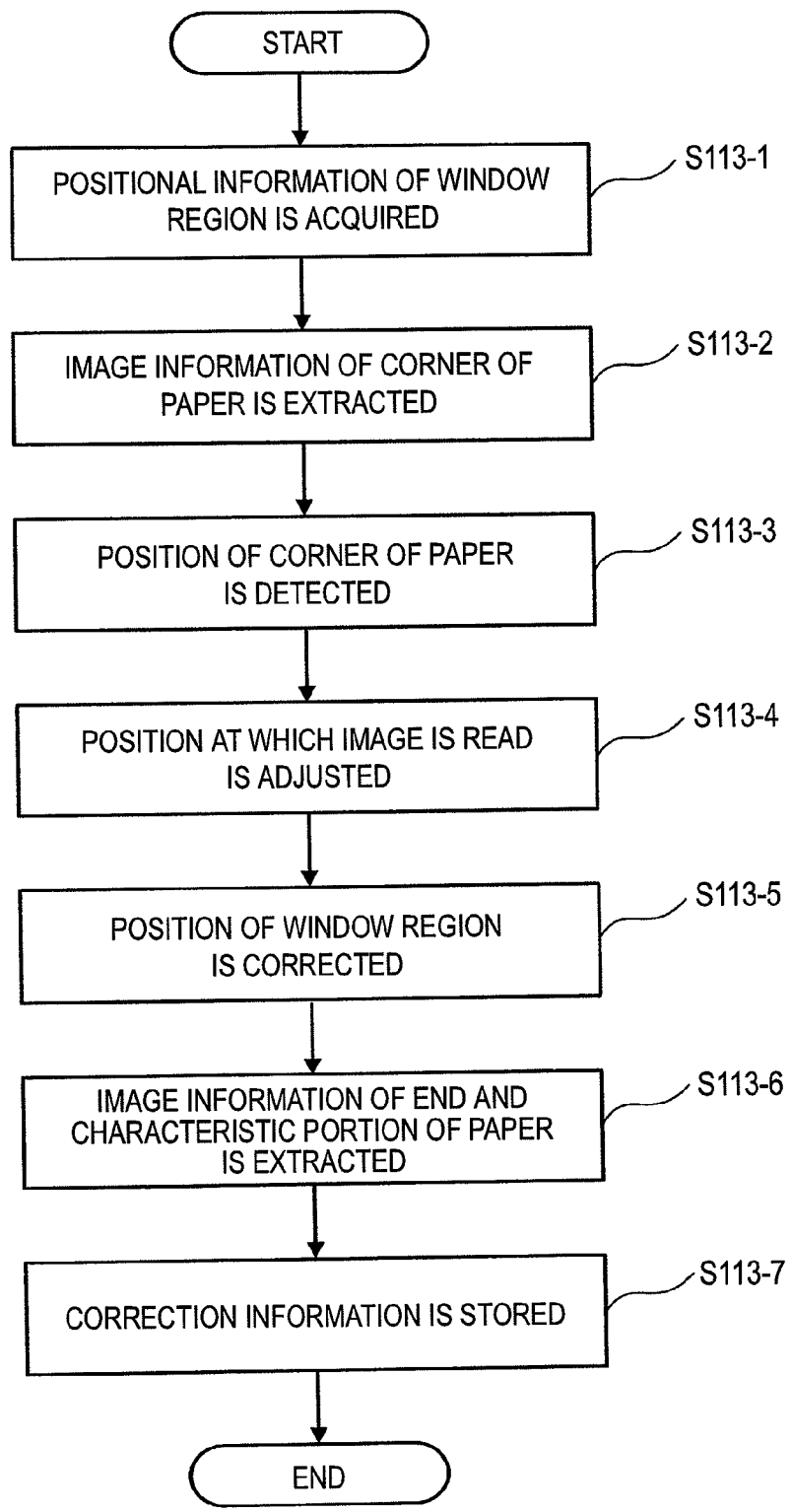
FIG. 10 is a diagram illustrating the procedure of extracting the correction information and adjusting the position for reading an image recorded on paper using the image reader.

FIG. 10 is a diagram illustrating the procedure of extracting the correction information and adjusting the position for reading an image recorded on paper by the image reader 100. In addition, this is given to explain the processing of step 113 described in FIG. 7 in more detail.

In step 113, first, the processing section 150 acquires the positional information regarding the window regions 171, 172, and 173 in order to extract the correction information from the image information acquired in step 112 (step 113-1). Specifically, the positional information is the coordinate information regarding the window regions 171, 172, and 173. The coordinate information is information included in a command transmitted from the main controller 50 described in step 111 of FIG. 7. Although described in detail later, the contents of processing performed in the places of the designated window regions 171, 172, and 173 are also included in the command. The coordinate information is the coordinates of one apex, which is set in advance, of each of the square window regions 171, 172, and 173, for example, and the positions of the window regions 171, 172, and 173 can be determined by using the coordinate information.

Then, the processing section 150 extracts an image corresponding to the position of the window region 171 from the image information (step 113-2). In the extracted image, four corners of the paper are included as the image information. Then, the processing section 150 detects the positions of four corners of the paper on the basis of the extracted image information (step 113-3). Specifically, the processing section 150 performs concentration detection from the end of the window region 171 in each of the x and y directions. In addition, the processing section 150 sets the coordinates, at which the concentration exceeds the threshold value set in advance in each of the x and y directions, as the position of a corner. Then, using the position of the corner detected by the window region 171-1 as the origin, the processing section 150 adjusts the position for reading the image recorded on the paper (step 113-4). Then, the processing section 150 corrects the positions of the window regions 171, 172, and 173 (step 113-5). Then, the processing section 150 extracts an image corresponding to the positions of the window regions 172 and 173 from the image information (step 113-6). In this case, the end of the paper and the characteristic portion in the image are included in the extracted image as the image information. Then, the processing section 150 stores, as the correction information, the image information extracted at the positions of the window regions 171, 172, and 173 (step 113-7). Specifically, for example, when extracting a lattice point in the window region 173, the processing section 150 performs concentration detection from the end of the window region 173 in each of the x and y directions. Then, the processing section 150 detects the position a, at which the concentration in the x and y directions exceeds the threshold value set in advance, and the position b, at which the concentration is lower than the threshold value, and sets the coordinates of (a+b)/2 as the position of the lattice point in each of the x and y directions. Then, the processing section 150 transmits the correction information to the main controller 50 through the input/output section 160 as described previously in step 114 of FIG. 7.

<Explanation Regarding the Contents of a Command>

FIG. 11 is a diagram illustrating an example of the contents of a command transmitted from the main controller 50 to the image reader 100 in step 111 of FIG. 7.

First, the main controller 50 transmits the information regarding the type of test chart read by the image reader 100. Then, the main controller 50 transmits the information regarding the number of sheets of paper of the test chart. In addition, the main controller 50 transmits the information regarding the sizes of the window regions 171, 172, and 173. In the present exemplary embodiment, since the shapes of the window regions 171, 172, and 173 are squares, the main controller 50 transmits the information regarding the rectangular size.

Then, after transmitting other required information, the main controller 50 transmits the coordinate information regarding the window regions 171, 172, and 173 and the correction information acquired in the places. Specifically, the main controller 50 transmits as the coordinate information the coordinates of one apex set in advance for the window regions 171, 172, and 173 and subsequently transmits the processing contents. The processing contents are various parameters required in order to acquire the correction information in the designated window regions 171, 172, and 173.

In addition, the above-described processing performed by the processing section 150 may be performed by the main controller 50. That is, the series of processing may be performed by the main controller 50 without providing the processing section 150.

In addition, although the image reader 100 described in detail above is a device for adjusting the image forming unit 11 of the image forming apparatus 1, the image reader 100 is not limited to this. For example, the image reader 100 may be applied as a reader, such as a general scanner, in which paper with an image including a document formed thereon is placed on a platen glass, light from a light source is irradiated to the document, and the reflected light is read by a CCD sensor or the like.

In addition, although the image reader 100 described in detail above is applied to the image forming apparatus 1 that forms an image by forming a toner image, its application is not limited to this. For example, the image reader 100 may be applied to an image forming apparatus that forms an image using an ink jet method.

In addition, although the square region is exemplified as a window region in the present exemplary embodiment, the window region is not limited to this, and the shape of the window region is not particularly limited. For example, the window region may have a circular shape. Moreover, although the sizes of all window regions are equal in the example described above, they have different sizes according to the type of the extracted image information.

Moreover, in the present exemplary embodiment, the above processing performed by the processing section 150 described in FIG. 10 is performed by a computer. In this case, a program executed by the computer may be regarded as a program causing the computer to realize: a function of acquiring image information from paper on which an image is recorded; a function of acquiring positional information of a window region for extracting correction information from the acquired image information; a function of extracting the correction information from the acquired image information on the basis of the positional information; and a function of outputting the correction information.

In addition, the image adjusting method described in FIG. 8 may be regarded as an image adjusting method including: irradiating light to paper on which an image is formed; receiving light reflected from the paper; generating image information from the received light; extracting information corresponding to a window region of the paper set in advance, as correction information, from the generated image information; and adjusting the image formed on the paper on the basis of the correction information.

The foregoing description of the exemplary embodiments of the present invention has been provided for the purpose of illustration and description. It is not intended to be exhaustive or to limit the invention to the precise forms disclosed. Obviously, many modifications and variations will be apparent to practitioners skilled in the art. The embodiments were chosen and described in order to best exemplify the principles of the invention and its practical applications, thereby enabling others skilled in the art to understand the invention for various embodiments and with the various modifications as are suited to the particular use contemplated. It is intended that the scope of the invention is defined by the following claims and their equivalents.

What is claimed is:

1. An image forming apparatus comprising:
    an image forming section that forms an image on a recording material;
    a reading unit that includes a light source for irradiating light to the recording material on which the image is formed, and a generation section for receiving light reflected from the recording material and generating image information from the received light, and that reads the image of the recording material in order to adjust the image formed on the recording material by the image forming section; and
    a processing section that extracts information corresponding to a window region of the recording material set in advance, as correction information required for adjustment of the image, from the image information generated by the generation section when light from the light source is irradiated to the recording material on which the image is formed,
    wherein the correction information extracted by the processing section is information regarding a position of a corner of the recording material,
    the processing section changes a position for reading the image recorded on the recording material according to the information regarding the position of the corner of the recording material as information for adjusting,
    wherein the image forming section includes:
        a toner image forming unit that forms a toner image;
        a transfer unit that transfers the toner image formed by the toner image forming unit onto the recording material; and a fixing unit that fixes the toner image transferred by the transfer unit to the recording material.

2. The image forming apparatus according to claim 1, wherein the correction information required for the adjustment includes information regarding a position of a corner of the recording material, and wherein the reading unit uses the information regarding the position of the corner as information for adjusting a position for reading the image recorded on the recording material.

3. The image forming apparatus according to claim 1, wherein the correction information extracted by the processing section further includes at least one of information regarding a position of an end of the recording material and information regarding a characteristic portion in the image.

4. The image forming apparatus according to claim 1, wherein the correction information is information for adjusting an image forming unit that forms the image on the recording material.

5. The image forming apparatus according to claim 1, wherein the processing section extracts only the information corresponding to the window region, which is smaller than the recording medium, as the correction information.

6. The image forming apparatus according to claim 1, further comprising:
    an output section that outputs the correction information for adjusting the image formed on the recording material.

7. The image forming apparatus according to claim 1, wherein a position of the window region is determined to acquire at least one of information regarding a position of a corner of the recording material, information regarding a position of an end of the recording material, and information regarding a characteristic portion in the image.

8. A non-transitory computer readable medium storing a program causing a computer to execute a process for adjusting an image, the process comprising:
    acquiring image information of a recording material on which an image is recorded;
    acquiring positional information of a window region for extracting correction information from the acquired image information;
    extracting the correction information from the acquired image information on the basis of the positional information; and
    outputting the correction information,
    wherein the extracted correction information is information regarding a position of a corner of the recording material, and
    a position for reading the image recorded on the recording material is changed according to the information regarding the position of the corner of the recording material as information for adjusting,
    wherein the process further comprises:
        forming a toner image;
        transferring the formed toner image formed onto the recording material; and
        fixing the transferred toner image to the recording material.

9. An image adjusting method comprising:
    irradiating light to a recording material on which an image is formed;
    receiving light reflected from the recording material;
    generating image information from the received light;
    extracting information corresponding to a window region of the recording material set in advance, as correction information, from the generated image information; and
    adjusting the image formed on the recording material on the basis of the correction information,
    wherein the extracted correction information is information regarding a position of a corner of the recording material,
    the adjusting the image comprises changing a position for reading the image recorded on the recording material according to the information regarding the position of the corner of the recording material as information for adjusting wherein the process further comprises:
        forming a toner image;
        transferring the formed toner image formed onto the recording material; and
        fixing the transferred toner image to the recording material.

* * * * *